(12) United States Patent
Landis et al.

(10) Patent No.: US 11,725,134 B2
(45) Date of Patent: Aug. 15, 2023

(54) DECREASING PROPPANT EMBEDMENT WITH AMINE-FUNCTIONALIZED POLYSACCHARIDES

(71) Applicant: Integrity Bio-Chemicals, LLC, Cresson, TX (US)

(72) Inventors: Charles R. Landis, The Woodlands, TX (US); Stephen William Almond, Creston, CA (US)

(73) Assignee: Integrity Bio-Chemicals, LLC, Cresson, TX (US)

( * ) Notice: Subject to any disclaimer, the term of this patent is extended or adjusted under 35 U.S.C. 154(b) by 0 days.

(21) Appl. No.: 17/151,934

(22) Filed: Jan. 19, 2021

(65) Prior Publication Data
US 2021/0139766 A1     May 13, 2021

Related U.S. Application Data

(63) Continuation-in-part of application No. PCT/US2020/036791, filed on Jun. 9, 2020.
(Continued)

(51) Int. Cl.
*C09K 8/68* (2006.01)
*C09K 8/80* (2006.01)
(Continued)

(52) U.S. Cl.
CPC ............ *C09K 8/68* (2013.01); *C09K 8/607* (2013.01); *C09K 8/80* (2013.01); *C09K 8/805* (2013.01); *C09K 8/905* (2013.01); *E21B 43/267* (2013.01)

(58) Field of Classification Search
CPC .................................................. E21B 43/267
See application file for complete search history.

(56) References Cited

U.S. PATENT DOCUMENTS

2006/0175058 A1    8/2006    Nguyen
2007/0044965 A1    3/2007    Middaugh et al.
(Continued)

FOREIGN PATENT DOCUMENTS

WO    2005040552 A1    5/2005

OTHER PUBLICATIONS

Written Opinion and International Search Report of PCT/US2020/036791 dated Sep. 18, 2020.
(Continued)

*Primary Examiner* — William D Hutton, Jr.
*Assistant Examiner* — Avi T Skaist
(74) *Attorney, Agent, or Firm* — Vorys, Sater, Seymour and Pease LLP (57) ABSTRACT

Proppant embedment can sometimes be problematic during fracturing operations. A partially oxidized, amine-functionalized polysaccharide comprising a plurality of oxidatively opened monosaccharide units and bearing an amine moiety at one or more sites of oxidative opening may lessen the amount of proppant embedment that occurs. Fracturing methods may comprise providing a fracturing fluid comprising such a partially oxidized, amine-functionalized polysaccharide and a plurality of proppant particulates, introducing the fracturing fluid into a subterranean formation at a hydraulic pressure sufficient to create or extend one or more fractures therein, such that at least a portion of the plurality of proppant particulates become localized in the one or more fractures, and releasing the hydraulic pressure. Upon releasing the hydraulic pressure, embedment of the proppant particulates in a face of the one or more fractures is about 10% to about 40% of a grain size of the proppant particulates. Regain permeability may also increase.

23 Claims, 5 Drawing Sheets

Related U.S. Application Data (60) Provisional application No. 62/859,400, filed on Jun. 10, 2019.

(51) Int. Cl.
   *C09K 8/90* (2006.01)
   *E21B 43/267* (2006.01)
   *C09K 8/60* (2006.01)

(56) References Cited

U.S. PATENT DOCUMENTS

| | | | |
|---|---|---|---|
| 2008/0280788 A1* | 11/2008 | Parris | C09K 8/685 507/209 |
| 2010/0101795 A1* | 4/2010 | Watson | E21B 43/267 166/308.1 |
| 2016/0076351 A1* | 3/2016 | Stehle | C09K 8/86 166/280.2 |
| 2018/0251669 A1 | 9/2018 | Nguyen et al. | |
| 2018/0340120 A1 | 11/2018 | Madduri | |

OTHER PUBLICATIONS

Fritah, Z., et al., "Direct evidence of amine-metal reaction in epoxy systems: An in situ calorimetry study of the interphase interaction," Progress in Organic Coatings, 2020, p. 105769, 148.

* cited by examiner

DECREASING PROPPANT EMBEDMENT WITH AMINE-FUNCTIONALIZED POLYSACCHARIDES

BACKGROUND

The recovery of hydrocarbons, such as oil and gas, from subterranean formations can be problematic in many instances. In recent years, hydraulic fracturing operations have become an important part of hydrocarbon recovery processes. Hydraulic fracturing operations introduce a fracturing fluid into a subterranean formation under high hydraulic pressures to expand existing fluid conduits within the formation matrix and/or create new fluid conduits by forcing the formation matrix apart. The term "fracture" is used herein to describe either type of fluid conduit. The fractures may increase the conductivity of the formation matrix. The term "fracturing" and grammatical variants thereof refers to the process of creating or extending a fracture under sufficient hydraulic pressure.

A plurality of particulates is usually introduced to a subterranean formation concurrently with a fracturing fluid in order to hold the fractures open once the hydraulic pressure has been released, thereby maintaining fracture conductivity to facilitate production. Once the plurality of proppants has become localized in a fracture, the plurality of proppants may be referred to as a proppant pack. In some instances, a proppant-free pad fluid may be introduced to the subterranean formation in advance of introducing a larger quantity of fracturing fluid. Common proppant particulates include, for example, sand (including silica and zircon sands) or ceramic particulates, although other types of particulate materials are also routinely used. A particular proppant material may be selected for a given fracturing operation based upon the selected fracturing conditions and the type of formation matrix present in the wellbore, for example.

One issue associated with the introduction and placement of proppant particulates in a subterranean formation is embedment of the proppant particulates once they have become placed in a fracture. In the ideal fracturing case, the proppant particulates rest upon the surface of the formation matrix within the fractures (i.e., on the fracture face) without becoming embedded, such that the full effective size of the proppant particulates (full effective diameter for substantially spherical proppant particulates) is available to maintain the fractures in an open condition. "Embedment" refers to the process whereby proppant particulates become at least partially pushed into the formation matrix when placed under compressive stress, thereby decreasing the effective fracture width compared to the width of the fully open condition attained under hydraulic pressure. When proppant embedment occurs, the full effective size (diameter) of the proppant particulates is no longer available for maintaining the fractures in the fully opened condition. Proppant embedment accounts to a type of formation damage, as discussed further below, and may significantly decrease production in some instances. Excessive proppant embedment may lead to low regain permeability values once the hydraulic fracturing pressure is released.

Figure 1A:
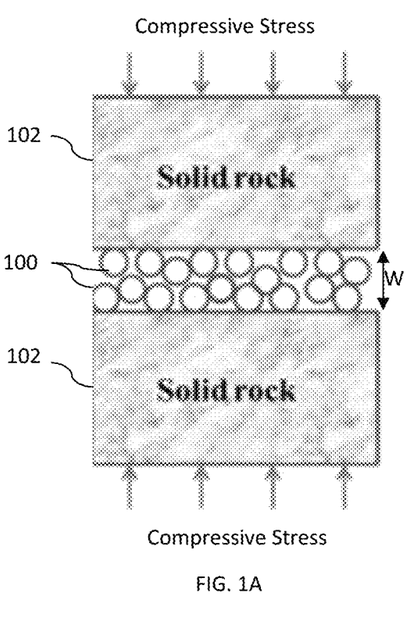
FIGS. 1A and 1B show diagrams of a proppant pack before and after proppant embedment occurs, respectively.
Figure 1B:
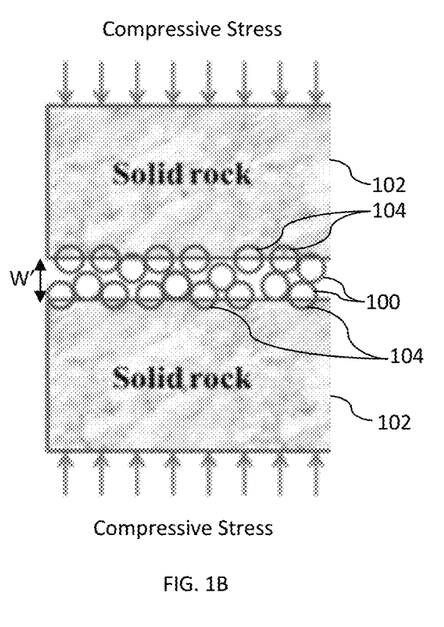

FIGS. 1A and 1B show diagrams of a proppant pack before and after proppant embedment occurs, respectively. As shown, proppant particulates 100 are disposed between opposing faces of formation matrix 102. Below a threshold compressive stress (FIG. 1A), no significant proppant embedment occurs. Above a threshold compressive stress (FIG. 1B), at least a portion of proppant particulates 100 are pushed into formation matrix 102 at embedment pits 104.

Although proppant embedment can occur in any type of formation matrix, it can be particularly prevalent in softer, relatively unconsolidated matrices, especially those containing significant amounts of clay. Depending on the type of formation matrix and the particular fracturing conditions that are present, embedment may be up to several proppant grain diameters in depth (i.e., multiple layers of packed proppants may be pushed into the formation matrix) and decrease the fracture width in the range of about 10-60% compared to the fully opened fracture width condition. When significant proppant embedment occurs, the formation conductivity may decrease following a fracturing operation rather than undergoing the desired conductivity increase. In a propped fracture, the majority of the conductivity may reside at the interface between the proppant particulates and the formation matrix, rather than in the middle portions of the fracture. Without being bound by theory or mechanism, the lower conductivity in the middle of a propped fracture is believed to result from a dense, close-packed or near close-packed arrangement of the proppant particulates in that location. At the proppant-formation matrix interface, in contrast, the packing density is looser and results in higher fracture conductivity in this location. As such, even a small extent of proppant embedment may be enough to interrupt the fracture conductivity at this location. Although proppant embedment and its accompanying formation damage may be mitigated somewhat by choosing a particular proppant best suited for a given type of formation matrix and specified fracturing conditions, it can still be a difficult matter to optimize the fracture conductivity properly in many cases.

Another issue sometimes occurring during fracturing operations is the formation of fines upon breakdown of the proppant particulates. Fines may migrate throughout the subterranean formation and decrease conductivity therein. Fines may form from proppant particulates due to partial crushing while under compressive stress and/or from frictional abrasion during transport downhole. Although fines production may be minimized to a large degree by choosing a proppant with a sufficiently high mechanical strength, it is usually not possible to eliminate the production of fines completely. Moreover, proppant particulates chosen to provide a sufficiently high mechanical strength may not be optimized for limiting proppant embedment in a given formation matrix.

BRIEF DESCRIPTION OF THE DRAWINGS

The following figures are included to illustrate certain aspects of the present disclosure and should not be viewed as exclusive embodiments. The subject matter disclosed is capable of considerable modifications, alterations, combinations, and equivalents in form and function, as will occur to one of ordinary skill in the art and having the benefit of this disclosure.

DETAILED DESCRIPTION

The present disclosure generally relates to fracturing operations and, more specifically, methods for modifying a fracturing operation to limit proppant embedment.

As discussed above, proppant embedment in the matrix of a subterranean formation during a fracturing operation can be problematic in various aspects. Proppant embedment may decrease fracture widths by about 10-60%, thereby leading to decreased conductivity and poor production. In some cases, the formation damage resulting from proppant embedment may become so significant that the conductivity may be lower than if the fracturing operation had not been performed at all, which may be observed in the form of poor regain permeability values. Fines produced from proppant particulates while downhole may also be problematic in various aspects. These issues and others can lead to considerable challenges when designing a fracturing operation that is suitably optimized for a given formation matrix.

The present disclosure demonstrates that fracturing fluids and/or pad fluids comprising particular functionalized polysaccharides may decrease the extent to which proppant embedment occurs under compressive stress during a fracturing operation. Suitable functionalized polysaccharides for decreasing proppant embedment may include, for example, polysaccharides that are partially oxidized by oxidative opening of at least a portion of their monosaccharide rings, followed by amine functionalization of the resulting ring-opened intermediate, as discussed further herein. Such functionalized polysaccharides may be referred to herein to as partially oxidized, amine-functionalized polysaccharides. Partially oxidized, amine-functionalized polysaccharides of this type may function as a clay control additive (clay stabilizer), as described in further detail in U.S. Pat. No. 10,072,208, which is incorporated herein by reference in its entirety. As a day control additive, the functionalized polysaccharides may be present in a wellbore in an amount sufficient to limit the swelling and expansion of a day-containing formation matrix, such as 1-70 wt. %, polymer loading. Lower concentrations within this range may be effective to limit proppant embedment, as discussed further herein.

Clay control additives are used in subterranean treatment operations to limit the effect of aqueous fluids on water-sensitive clays. As used herein, the term "clay control additive" refers to any substance that aids in stabilizing a clay mineral against undesirable interactions with an aqueous fluid, thereby decreasing or eliminating propensity for the clay mineral to swell and/or migrate in the form of fines. Conventional clay stabilizers are inorganic salts, such as potassium chloride, which may interact with a clay surface to promote ion-exchange and dewatering of the clay structure, thereby producing a potassium-laden clay that is much less prone to swelling and fines migration. Undesirably, including high salt concentrations in a fracturing fluid may impact the fluid viscosity or fluid weight, which may alter the transport of proppant particulates into a desired location. For example, high salt concentrations in a fracturing fluid may prevent a viscosifying polymer from functioning properly to promote proppant transport during a fracturing operation. In addition, cost and environmental concerns may arise when using a salt-based clay stabilizer. Partially oxidized, amine-functionalized polysaccharides or similar functionalized polysaccharides may alleviate these difficulties. Partially oxidized, amine-functionalized polysaccharides include both full-length polysaccharide molecules and shorter analogues, such as partially oxidized, amine-functionalized dextrins, as discussed further herein. In a non-limiting example, mixtures of partially oxidized, amine-functionalized dextran and partially oxidized, amine-functionalized dextrin may be used in the disclosure herein.

Although partially oxidized, amine-functionalized polysaccharides or similar functionalized polysaccharides may be effective for promoting day control, their ability to limit proppant embedment was completely unexpected. In particular, when limiting the swelling and expansion of a clay-containing formation matrix with a day control additive, the hardness of the formation matrix as a whole is not typically increased significantly, Therefore, decreased proppant embedment in the presence of a day control additive would not be expected to occur with the parameters of a fracturing operation otherwise being held constant. Indeed, conventional salt-based clay control additives are not believed to demonstrate an ability to decrease proppant embedment. However, decreasing day swelling and expansion in the presence of a partially oxidized, amine-functionalized polysaccharide or similar functionalized polysaccharide may afford an unexpected concurrent decrease in proppant embedment, as discussed herein. Moreover and further surprisingly, the decreased proppant embedment described herein may be realized in formation matrices having relatively low day contents, such as those containing about 10% to about 40% clay by weight, Even formation matrices that are substantially clay free may experience decreased proppant embedment when performing a fracturing operation according to the disclosure herein.

In addition to decreasing proppant embedment in fractures, the partially oxidized, amine-functionalized polysaccharides or similar functionalized polysaccharides described herein may unexpectedly decrease the quantity of fines formed from the proppant particulates while downhole, as compared to the quantity of fines formed in the absence of the functionalized polysaccharides. Decreasing the production of fines may similarly benefit a fracturing operation.

Advantageously, the partially oxidized, amine-functionalized polysaccharides described herein may be produced inexpensively through relatively simple chemical reactions. Moreover, since such functionalized polysaccharides originate from non-toxic biological sources, the partially oxidized, amine-functionalized polysaccharides, including partially oxidized, amine-functionalized dextrins, may exhibit a relatively benign environmental profile compared to conventional clay control additives, thereby facilitating their use in environmentally sensitive areas and other locales where other additives may be problematic or undesirable. Similar benefits may be realized when utilizing these compounds for limiting proppant embedment.

In various embodiments, fracturing operations of the present disclosure may comprise introducing a fracturing fluid or a pad fluid comprising an aqueous fluid and a partially oxidized, amine-functionalized polysaccharide or a similar functionalized polysaccharide into a subterranean formation. The fracturing fluid or pad fluid may be introduced to the subterranean formation at or above a fracture gradient pressure of the subterranean formation such that at least one fracture in the subterranean formation is created or extended in the presence of the fracturing fluid. Once hydraulic pressure is released from the subterranean formation and the formation matrix relaxes, the proppant particulates may remain disposed within the fractures under compressive stress and experience decreased proppant embedment in the formation matrix by applying the disclosure herein. Namely, by including a partially oxidized, amine-functionalized polysaccharide or similar functionalized polysaccharide in the fracturing fluid and/or pad fluid, the extent of proppant embedment in the formation matrix in the presence of a compressive stress may be decreased compared to that otherwise occurring in the absence of the partially oxidized, amine-functionalized polysaccharide or similar functionalized polysaccharide.

The decreased proppant embedment may be characterized in terms of the regain permeability that is observed following release of the hydraulic fracturing pressure. The term "regain permeability" refers to the ratio of the formation permeability following hydraulic fracturing as compared to the pre-fracturing permeability. A regain permeability ratio of less than 1 (100%) indicates a decrease in permeability following fracturing, whereas a regain permeability ratio greater than 1 (100%) is characteristic of a desirable increase in permeability. When a partially oxidized, amine-functionalized polysaccharide is utilized according to the present disclosure, regain permeability values may exceed about 100%.

In some embodiments, the partially oxidized, amine-functionalized polysaccharides may be included in a fracturing fluid comprising a plurality of proppant particulates. Such methods of the present disclosure may comprise: providing a fracturing fluid comprising an aqueous fluid, a plurality of proppant particulates, and a partially oxidized, amine-functionalized polysaccharide; introducing the fracturing fluid into a subterranean formation at a hydraulic pressure sufficient to create or extend one or more fractures therein, such that at least a portion of the plurality of proppant particulates becomes localized in the one or more fractures; and releasing the hydraulic pressure. Embedment of the proppant particulates in a face of the one or more fractures is at most about 10% to about 40% of a grain size of the proppant particulates following release of the hydraulic pressure. The partially oxidized, amine-functionalized polysaccharide includes glycosidic bonds retained from a parent polysaccharide, and in which an amine moiety is located at a site of oxidative opening. Partial oxidation comprises oxidative opening of a monosaccharide unit of the parent polysaccharide to produce one or more sites of oxidative opening.

Alternately, the decreased proppant embedment may be characterized in terms of increased regain permeability. When a partially oxidized, amine-functionalized polysaccharide is utilized in accordance with the disclosure herein, the regain permeability may be about 110% or greater, or about 120% or greater, or about 130% or greater, or about 140% or greater, or about 150% or greater, or about 160% or greater. Accordingly, such methods may comprise providing a fracturing fluid comprising an aqueous fluid, a plurality of proppant particulates, and a partially oxidized, amine-functionalized polysaccharide; introducing the fracturing fluid into a subterranean formation at a hydraulic pressure sufficient to create or extend one or more fractures therein, such that at least a portion of the plurality of proppant particulates becomes localized in the one or more fractures; and releasing the hydraulic pressure; wherein a regain permeability of the subterranean formation exceeds 110% after the hydraulic pressure is released.

In some or other embodiments, the partially oxidized, amine-functionalized polysaccharides may be included in a pad fluid introduced to a subterranean formation in advance of a fracturing fluid comprising a plurality of proppant particulates. The pad fluid may lack proppant particulates or include proppant particulates that are smaller than those present in the fracturing fluid. The fracturing fluid introduced after the pad fluid may or may not contain the partially oxidized, amine-functionalized polysaccharide. Such methods of the present disclosure may comprise: providing a pad fluid comprising an aqueous fluid and a partially oxidized, amine-functionalized polysaccharide; introducing the pad fluid into a subterranean formation at a hydraulic pressure sufficient to create or extend one or more fractures therein; after introducing the pad fluid to the subterranean formation, introducing a fracturing fluid comprising the aqueous fluid and a plurality of proppant particulates into the subterranean formation, such that at least a portion of the plurality of proppant particulates becomes localized in the one or more fractures; and releasing the hydraulic pressure. Embedment of the proppant particulates in a face of the one or more fractures is at most about 10% to about 40% of a grain size of the proppant particulates following release of the hydraulic pressure. The partially oxidized, amine-functionalized polysaccharide includes glycosidic bonds retained from a parent polysaccharide, and in which an amine moiety is located at a site of oxidative opening. Partial oxidation comprises oxidative opening of a monosaccharide unit of the parent polysaccharide to produce one or more sites of oxidative opening.

When using a pad fluid, the decreased proppant embedment may similarly be characterized in terms of the increased regain permeability. Such methods may comprise: providing a pad fluid comprising an aqueous fluid and a partially oxidized, amine-functionalized polysaccharide; introducing the pad fluid into a subterranean formation at a hydraulic pressure sufficient to create or extend one or more fractures therein; after introducing the pad fluid to the subterranean formation, introducing a fracturing fluid comprising the aqueous fluid and a plurality of proppant particulates into the subterranean formation, such that at least a portion of the plurality of proppant particulates becomes localized in the one or more fractures; and releasing the hydraulic pressure; wherein a regain permeability of the subterranean formation exceeds 110% after the hydraulic pressure is released. Optionally, the fracturing fluid may comprise the partially oxidized, amine-functionalized polysaccharide as well.

When characterized in terms of proppant embedment depth, the extent of embedment of the proppant particulates within the fractures may be determined by measuring pit depth and comparing the pit depth to the average diameter of the proppant particulates, in a particular example. The term "pit depth" refers to the depth of indentions upon the fracture face, as compared to the average surface irregularity. As a non-limiting example, if the measured pit depth is half of the average diameter of the proppant particulates, the proppant particulates would be considered 50% embedded.

In other particular examples, the amount of proppant embedment may be decreased by up to about 10%, or up to about 20%, or up to about 30%, or up to about 40%, or up to about 50%, or up to about 60% relative to that occurring in the absence of the partially oxidized, amine-functionalized polysaccharide or a similar functionalized polysaccharide. Thus, by applying the disclosure herein, increased conductivity within the fractures may result by limiting the extent to which proppant embedment takes place.

When characterized in terms of regain permeability, conductivity may be determined by API Recommended Practice 19D "Procedures for measuring the long term conductivity of proppants." The regain permeability may then be characterized as a ratio of the formation permeability in comparison to a control, as discussed above.

Proppant particulates suitable for use in the disclosure herein are not considered to be especially limited. The proppant particulates may comprise sand (e.g., silica or zircon sand) or a ceramic, in any embodiment of the present disclosure. For purposes of the present disclosure, the term "ceramic" refers to one or more metal oxides, and/or one or more non-oxides that are considered to be ceramics, such as carbides, borides, nitrides, and/or silicides. As such, the term "ceramic" includes glass materials, oxide ceramic materials, and/or non-oxide ceramic materials. Suitable ceramic proppant particulates may be crystalline, non-crystalline, and/or partially crystalline in morphology.

Suitable sand particulates for use in the disclosure herein may include, for example, 30/50 sand (300 μm-600 μm), 40/70 sand (212 μm-420 μm), 70/140 sand (106 μm-212 μm), or any combination thereof. Some sand particulates may be considered to constitute a microproppant, as defined below. Particular sand particulates may be uncoated, such that the partially oxidized, amine-functionalized polysaccharide or similar functionalized polysaccharide is not present upon the sand particulates when introduced to the wellbore.

Other proppant particulates that may be suitable for use in the disclosure herein include, for example, bauxite, polymer materials, polytetrafluoroethylene materials, nut shell pieces, cured resinous particulates including nut shell pieces, seed shell pieces, cured resinous particulates including seed shell pieces, fruit pit pieces, cured resinous particulates including fruit pit pieces, wood, composite particulates, and combinations thereof. Suitable composite particulates may include a binder and a filler material wherein suitable filler materials include silica, alumina, fumed carbon, carbon black, graphite, mica, titanium dioxide, meta-silicate, calcium silicate, kaolin, talc, zirconia, boron, fly ash, hollow glass microspheres, solid glass, and combinations thereof.

Any of the proppant particulates used in the disclosure herein may be nanoparticulate in size (nanoproppant), microparticulate in size (microproppant), larger sizes, or any combinations thereof. As used herein, the term particle size refers to a $d_{50}$ particle size distribution, which may be measured by a suitable particle size analyzer, such as those manufactured by Malvern Instruments. The term "nanoproppant" refers to any proppant particulates having a $d_{50}$ particle size distribution of about 1 micron or less. The term "microproppant" refers to any proppant particulates having a $d_{50}$ particle size distribution ranging from about 1 micron to about 1000 microns, particularly a $d_{50}$ particle size distribution ranging from about 1 micron to about 44 microns, or about 40 microns to about 100 microns, or about 50 microns to about 150 microns.

Suitable proppant particulates may exhibit a range of density values and may include any shape, including but not limited, to spherical, toroidal, amorphous, planar, cubic, or cylindrical. Proppant particulates may be included in a fracturing fluid in an amount ranging from about 0.1 pounds per gallon ("ppg") (12 kg/m$^3$) to about 14 ppg (1677 kg/m$^3$), or from about 0.1 ppg (12 kg/m$^3$) to about 1 ppg (119.8 kg/m$^3$), or from about 1 ppg (119.8 kg/m$^3$) to about 3 ppg (359.4 kg/m$^3$), or from about 3 ppg (359.4 kg/m$^3$) to about 6 ppg (718.8 kg/m$^3$), or from about 6 ppg (718.8 kg/m$^3$) to about 9 ppg (1078.2 kg/m$^3$), or from about 9 ppg (1078.2 kg/m$^3$) to about 12 ppg (1437.6 kg/m$^3$), or from about 12 ppg (1437.6 kg/m$^3$) to about 14 ppg (1677.2 kg/m$^3$).

Pad fluids used in the disclosure herein may be proppant-free or comprise nanoproppant and/or microproppant in particular embodiments. In some or other embodiments, a fracturing fluid of the present disclosure may comprise larger proppant particulates than are present in a pad fluid, if used. By way of non-limiting example, a pad fluid may comprise nanoproppant and the fracturing fluid may comprise microproppant, or the pad fluid may comprise a first portion of microproppant (e.g., microproppant having a $d_{50}$ of 1-44 microns) and the fracturing fluid may comprise a second portion of microproppant having a larger particle size (e.g., microproppant having a $d_{50}$ greater than 44 microns) or even larger proppant particulates. Still other examples may include microproppant having a $d_{50}$ of 1-44 microns in a fracturing fluid, with or without a proppant-free pad fluid being used.

Parent polysaccharides and functionalized polysaccharides suitable for use in the various embodiments of the present disclosure are environmentally safe, substantially nonhazardous to work with, and generally biocompatible. Parent polysaccharides such as dextran, levan and guar, for example, as well as their functionalized forms, are also biodegradable and pose little to no threat to the environment, even when used in a fracturing fluid or pad fluid in high concentrations. In addition, these types of parent polysaccharides may be sourced or produced at relatively low cost. Functionalized polysaccharides suitable for use in the disclosure herein are generally non-crosslinked.

In formulating fracturing fluids suitable for use in the disclosure herein, the functionalized polysaccharides are admixed with a suitable carrier fluid and are not pre-coated upon the proppant particulates.

Suitable parent polysaccharides that may undergo amine functionalization in the disclosure herein include, for example, levan, dextran, guar (guar gum), scleroglucan, welan, pullulan, xanthan (xanthan gum), schizophyllan, cellulose, and any combination thereof. Dextran, levan and guar may be particularly desirable parent polysaccharides for use in forming partially oxidized, amine-functionalized polysaccharides suitable for used in the disclosure herein. Derivative forms of the foregoing polysaccharides may undergo amine functionalization as well and may similarly be suitable for use in the disclosure herein. Guar derivatives suitable for use in the present disclosure may include, for example, carboxyalkyl or hydroxyalkyl derivatives of guar, such as, for example, carboxymethyl guar, carboxymethylhydroxyethyl guar, hydroxyethyl guar, carboxymethylhydroxypropyl guar, ethyl carboxymethyl guar, and hydroxypropylmethyl guar. Suitable dextran and levan derivatives may similarly include, for example, carboxyalkyl or hydroxyalkyl derivatives of dextran or levan, such as, for example, carboxymethyl dextran (levan), carboxymethylhydroxyethyl dextran (levan), hydroxyethyl dextran (levan), carboxymethylhydroxypropyl dextran (levan), ethyl carboxymethyl dextran (levan), and hydroxypropylmethyl dextran (levan).

The corresponding parent dextrins may also be used to prepare partially oxidized, amine-functionalized dextrins and other similar functionalized compounds in some embodiments of the disclosure herein.

Parent polysaccharides suitable for use in forming partially oxidized, amine-functionalized polysaccharides may encompass a wide range of molecular weights. In illustrative embodiments, the molecular weight of the parent polysaccharides may range from about 1 million to about 50 million Daltons, or from about 1 million to about 5 million Daltons, or from about 3 million to about 10 million Daltons, or from about 5 million to about 10 million Daltons, or from about 10 million to about 20 million Daltons, or from about 20 million to about 30 million Daltons, or from about 30 million to about 40 million Daltons, or from about 40 million to about 50 million Daltons.

Particularly suitable functionalized polysaccharides for use in the present disclosure may comprise a partially oxidized polysaccharide formed from any of the parent polysaccharides mentioned above, and which has undergone further amine functionalization. The parent polysaccharides comprise a plurality of monosaccharide rings that are polymerized together through glycosidic bonds. In the partially oxidized polysaccharides, at least a portion of the monosaccharide rings are oxidatively opened (i.e., to an acyclic form), and the glycosidic bonds remain intact. The amines may be in the form of a secondary amine or a tertiary amine once incorporated at a site of oxidative opening in the partially oxidized polysaccharides.

In illustrative embodiments, partially oxidized polysaccharides may be formed through oxidation of a vicinal diol upon the monosaccharide rings of the parent polysaccharide, thereby generating an acyclic dialdehyde at one or more sites of oxidative opening. Reagents such as sodium periodate, for example, may be suitable to perform such selective oxidation reactions without cleaving the glycosidic bonds along the polysaccharide polymer backbone. The dialdehyde may then be converted into a secondary amine or tertiary amine functionality through reductive amination. As such, partially oxidized polysaccharides suitable for use in the present disclosure may be functionalized with one or more amine groups at a site of oxidative opening, according to various embodiments. Some or all of the sites of oxidative opening may undergo amine functionalization in the disclosure herein. Diamines may be reacted to introduce one amine group that is covalently bonded to the site of oxidative opening, thereby leaving the other amine group tethered to the site of oxidative opening.

Scheme 1 below shows the process through which a monosaccharide ring may be oxidatively opened (e.g. via a sodium periodate oxidation) and then undergo a subsequent conversion by reductive amination (e.g., by reaction of the dialdehyde with an amine in the presence of a reducing agent, such as sodium borohydride). It is to be appreciated that the monosaccharide ring configuration depicted in Scheme 1 is illustrative and non-limiting. Any monosaccharide ring having a vicinal diol may undergo oxidative ring opening in the disclosure herein. The R group in Scheme 1 is a hydrocarbyl group, which may be substituted or unsubstituted, alkyl or aromatic, linear or branched, and/or cyclic or acyclic.

Scheme 1

Both of the aldehyde groups in the intermediate dialdehyde need not necessarily undergo conversion into an amine, as depicted in Scheme 1. According to various embodiments of the present disclosure, each site of oxidative opening in a partially oxidized polysaccharide may comprise from zero to two amine groups. When both aldehydes of the dialdehyde undergo reductive amination, two amine groups are present. In contrast, when zero or one amine groups are present, one or both of the aldehyde groups are instead reduced to primary alcohols under the reductive amination conditions rather than reacting with the amine. The number of amine groups at each site of oxidative opening, as well as the number of amine groups on the whole that are introduced, may be dependent upon the number of equivalents of amine that are added when conducting the reductive amination reaction. In particular instances, about 10 percent or more of the monosaccharide units (counting both non-oxidized and oxidatively opened monosaccharide units) in the partially oxidized polysaccharide may be coupled to at least one amine group.

In more particular embodiments, the amine groups bonded at a site of oxidative opening in the partially oxidized polysaccharide may be a secondary alkyl amine, which may be introduced during reductive amination through the reaction of a primary alkyl amine with the intermediate dialdehyde. Any of alkyl monoamines, diamines, triamines, tetraamines, or even higher polyamines may be bonded to the site of oxidative opening, according to various embodiments. The primary alkyl amine may comprise a hydrocarbyl group (corresponding to R in Scheme 1), which becomes bonded to the secondary amine group within the partially oxidized, amine-functionalized polysaccharide. The hydrocarbyl group may also be bonded to one or more additional amine groups in diamine and higher polyamine compounds, where the additional amine group(s) is/are tethered to the site of oxidative opening by the hydrocarbyl group.

Formulas 1-3 below show illustrative structures of partially oxidized polysaccharides bearing an amine group at the site of oxidative opening, which may be suitable for use in the disclosure herein. Formula 1 shows a partially oxidized, amine-functionalized dextran; Formula 2 shows a partially oxidized, amine-functionalized levan; and Formula 3 shows a partially oxidized, amine-functionalized guar. The structures in Formulas 1-3 show a diamine reaction product at the site of oxidative opening. It is to be appreciated that the structures shown in Formulas 1-3 are illustrative and non-limiting. For example, the monosaccharide ring undergoing oxidative opening, the site of oxidative opening, the extent of oxidative opening, and the particular amine being incorporated may vary from that depicted. Moreover, although Formulas 1-3 have shown one amine becoming bonded to the site of oxidative opening (i.e., the second aldehyde of the dialdehyde being reduced to a primary alcohol), it is to be appreciated that two bonded amines may be present under certain reaction conditions, such as when excess amine reagent is present. It is to be further appreciated that some sites of oxidative opening may lack an amine functionality altogether, in which case, two primary alcohols may remain at the site of oxidative opening following reductive amination.

compounds may also be used to form partially oxidized, amine-functionalized dextrin compounds suitable for use in the disclosure herein.

Other functionalized polysaccharides suitable for use in the disclosure herein may comprise a polysaccharide in which an amine group has been introduced to a monosaccharide ring without partially oxidizing the parent polysaccharide. Functionalized polysaccharides of this type may be formed by reacting a parent polysaccharide with a reagent bearing an amine or amine precursor in combination with a reactive functionality, such as an epoxide or a halide leaving group. In such functionalized polysaccharides, the backbone (glycosidic bonds) and side chain structure of the parent polysaccharide remain intact, and the amine groups are bonded through an ether linkage formed from pendant hydroxyl groups via a hydrocarbyl spacer. Amines incorporated in this manner may reside at the terminus of the hydrocarbyl spacer, and/or the amines may be internal within the hydrocarbyl spacer. The incorporated amines may be any of primary amines, secondary amines, tertiary amines, or quaternized amines (e.g., tetraalkylammonium salts). Other heteroatom functionality may be present within the hydrocarbyl spacer as well.

Partially oxidized, amine-functionalized dextrins, such as partially oxidized, amine-functionalized maltodextrin, may be formed in a similar manner to that depicted in Scheme 1 above. Suitable parent maltodextrins and other dextrins may feature a range of oligomer sizes, such as about 2 to about 20 glucose monomers per parent dextrin compound, each linked together with α(1,4) glycosidic bonds, and with a portion of the glucose units being oxidatively opened and functionalized with at least one amine group at a site of oxidative opening. Other parent dextrin compounds may contain only α(1,6) glycosidic bonds, and such dextrin Formulas 4-6 below show some illustrative structures of functionalized polysaccharides that may be suitable for use in the disclosure herein, in which an amine group is bonded via a hydrocarbyl spacer forming an ether linkage to a parent polysaccharide. Formula 4 shows an amine-functionalized dextran, Formula 5 shows an amine-functionalized levan, and Formula 6 shows an amine-functionalized guar. In such structures, the monosaccharide units remain intact (i.e., non-oxidized) and undergo functionalization upon the pendant hydroxyl groups. It is to be recognized that the incorporated amine group need not necessarily extend from the depicted pendant hydroxyl group, nor is the manner of bonding limited to that shown in the depicted structures. Moreover, although Formulas 4-6 have shown one amine group being bonded to the polysaccharide through an intervening ether linkage formed from a pendant hydroxyl group, it is to be appreciated that more than one amine group may be bonded as well (i.e., to separate pendant hydroxyl groups).

functionalized polysaccharide may have a concentration in the fracturing fluid or pad fluid that is suitable for decreasing proppant embedment, such as illustrative amounts ranging from about 0.05 wt. % to about 25 wt. %, or from about 0.05 wt. % to about 2 wt. %, or from about 0.1 wt. % to from about 2 wt. %, or from about 0.1 wt. % to from about 1 wt. %, or from about 0.1 wt. % to about 0.5 wt. %, or from about

Formula 4

Formula 5

Formula 6

In formulating a fracturing fluid or pad fluid suitable for use in the disclosure herein, the partially oxidized, amine-functionalized polysaccharides may be formulated with a suitable liquid carrier. The liquid carrier may be water or an aqueous fluid in particular embodiments. Suitable sources of water may include, but are not limited to, fresh water, produced water, salt water, surface water, brine or any other type of water. The term "salt water" refers to an unsaturated salt solution. Suitable aqueous carrier fluids may include any mixture of water and a water-miscible organic solvent, such as an alcohol or glycol. In more specific embodiments, the 0.5 wt. % to about 2 wt. %, or from about 0.5 wt. % to about 1 wt. %, or from about 5 wt. % to about 20 wt. %, or from about 5 wt. % to about 15 wt. %, or from about 5 wt. % to about 10 wt. %.

In addition to the partially oxidized, amine-functionalized polysaccharides or other functionalized polysaccharides, various other additives may be present in a fracturing fluid or pad fluid suitable for use in the present disclosure. As an example, gelling agents (viscosifying polymers) may be included in a fracturing fluid to increase the fluid's viscosity, which may be desirable for some applications. A viscosified fracturing fluid may be better suited to transport significant quantities of suspended proppant particulates. Suitable gelling agents may include, but are not limited to, a hydratable polymer or crosslinkable polymer including, but not limited to, galactomannan gums, cellulose derivatives, combinations thereof, derivatives thereof, and the like. Particular examples may include, for example, gum arabic, gum ghatti, gum karaya, tamarind gum, tragacanth gum, guar gum, locust bean gum, hydroxyethylguar, hydroxypropylguar, carboxymethylguar, carboxymethylhydroxyethylguar, carboxymethylhydroxypropylguar, hydroxyethylcellulose, carboxyethylcellulose, carboxymethylcellulose, and carboxymethylhydroxyethylcellulose, or any combination thereof derivatives thereof, and combinations thereof. Crosslinkable polymers suitable for inclusion in the fracturing fluids of the present disclosure may be naturally occurring and/or synthetic and contain one or more functional groups such as hydroxyl, carboxyl, sulfate, sulfonate, phosphate, phosphonate, amino, or amide groups. The functional groups may be crosslinked by a reaction with a suitable crosslinking agent.

It is also to be appreciated that other various additives may be included in the fracturing fluids and pad fluids disclosed herein. Suitable additives that may be optionally present include, but are not limited to, salts, acids, fluid loss control additives, gas, foamers, corrosion inhibitors, scale inhibitors, catalysts, biocides, friction reducing polymers, iron control agent, antifoam agents, bridging agents, dispersants, hydrogen sulfide scavengers, carbon dioxide scavengers, oxygen scavengers, lubricants, viscosifiers, breakers, weighting agents, inert solids, emulsifiers, emulsion thinners, emulsion thickeners, surfactants, lost circulation additives, pH control additives, buffers, crosslinkers, stabilizers, chelating agents, mutual solvents, oxidizers, reducers, consolidating agents, complexing agents, particulate materials and any combination thereof. With the benefit of this disclosure, one of ordinary skill in the art will be able to recognize and select a suitable optional additive for use in the fracturing fluid or pad fluid.

Some particularly suitable fracturing fluids and pad fluids may include an oxidant in addition to the partially oxidized, amine-functionalized polysaccharide. Suitable oxidants may include, but are not limited to, hydrogen peroxide, sodium hypochlorite, potassium monoperoxysulfate (OXONE), and any combination thereof. Without being bound by any theory or mechanism, including a mild oxidant in the fracturing fluid or pad fluid may facilitate cleaning of the fracture face, which may afford increased regain permeability when used in combination with a partially oxidized, amine-functionalized polysaccharide according to the disclosure herein. When used, an oxidant may be present in an amount ranging from about 0.05 wt. % to about 25 wt. %, or from about 0.05 wt. % to about 2 wt. %, or from about 0.1 wt. % to from about 2 wt. %, or from about 0.1 wt. % to from about 1 wt. %, or from about 0.1 wt. % to about 0.5 wt. %, or from about 0.5 wt. % to about 2 wt. %, or from about 0.5 wt. % to about 1 wt. %, or from about 5 wt. % to about 20 wt. %, or from about 5 wt. % to about 15 wt. %, or from about 5 wt. % to about 10 wt. %.

Embodiments disclosed herein include:

A. Fracturing methods. The methods comprise: providing a fracturing fluid comprising an aqueous fluid, a plurality of proppant particulates, and a partially oxidized, amine-functionalized polysaccharide in which glycosidic bonds are retained from a parent polysaccharide and partial oxidation comprises oxidative opening of a monosaccharide unit of the parent polysaccharide; wherein an amine moiety is located at a site of oxidative opening; introducing the fracturing fluid into a subterranean formation at a hydraulic pressure sufficient to create or extend one or more fractures therein, such that at least a portion of the plurality of proppant particulates become localized in the one or more fractures; and releasing the hydraulic pressure; wherein embedment of the proppant particulates in a face of the one or more fractures is at most about 10% to about 40% of a grain size of the proppant particulates following release of the hydraulic pressure, a regain permeability of the subterranean formation exceeds 110% following release of the hydraulic pressure, or any combination thereof.

B. Fracturing methods employing a pad fluid. The methods comprise: providing a pad fluid comprising an aqueous fluid and a partially oxidized, amine-functionalized polysaccharide in which glycosidic bonds are retained from a parent polysaccharide and partial oxidation comprises oxidative opening of a monosaccharide unit of the parent polysaccharide; wherein an amine moiety is located at a site of oxidative opening; introducing the pad fluid into a subterranean formation at a hydraulic pressure sufficient to create or extend one or more fractures therein; after introducing the pad fluid to the subterranean formation, introducing a fracturing fluid comprising the aqueous fluid and a plurality of proppant particulates into the subterranean formation, such that at least a portion of the plurality of proppant particulates become localized in the one or more fractures; and releasing the hydraulic pressure; wherein embedment of the proppant particulates in a face of the one or more fractures is at most about 10% to about 40% of a grain size of the proppant particulates following release of the hydraulic pressure, a regain permeability of the subterranean formation exceeds 110% following release of the hydraulic pressure, or any combination thereof.

Embodiments A and B may have one or more of the following additional elements in any combination.

Element 1: wherein the subterranean formation comprises a clay-containing formation matrix.

Element 2: wherein the clay-containing formation matrix comprises about 10% to about 40% clay by weight.

Element 3: wherein the parent polysaccharide comprises a dextran, a levan, or a guar.

Element 4: wherein the parent polysaccharide comprises a dextran or a dextrin.

Element 4A: wherein the dextrin comprises a maltodextrin.

Element 5: wherein the parent polysaccharide comprises a plurality of monosaccharide units and about 5%-80% of the plurality of monosaccharide units are oxidatively opened and bear an amine moiety at the site of oxidative opening.

Element 6: wherein the plurality of proppant particulates comprises a plurality of microproppant particulates.

Element 7: wherein the plurality of proppant particulates comprises a plurality of sand particulates.

Element 8: wherein the amine comprises an alkylamine.

Element 9: wherein the amine comprises an alkyl diamine.

Element 10: wherein the partially oxidized, amine-functionalized polysaccharide limits production of fines from the proppant particulates.

Element 11: wherein the fracturing fluid further comprises the partially oxidized, amine-functionalized polysaccharide.

Element 12: wherein the fracturing fluid further comprises a mild oxidant.

Element 12A: wherein the fracturing fluid and/or the pad fluid further comprises a mild oxidant.

By way of non-limiting example, exemplary combinations applicable to A and B include: 1 and 3; 1 and 4 or 4A; 1 and 5; 1 and 6, 1 and 7; 1, 6 and 7; 1 and 8; 1 and 9; 1 and 10; 1 and 12; 2 and 4 or 4A; 2 and 5; 2 and 6; 2 and 7; 2, 6 and 7; 2 and 8; 2 and 9; 2 and 10; 2 and 12; 3, 4 or 4A, and 5; 3, 4 or 4A, and 6; 3, 4 or 4A, and 7; 3, 4 or 4A, 6 and 7; 3, 4 or 4A, and 8; 3, 4 or 4A, and 9; 3, 4 or 4A, and 10; 3, 4 or 4A, and 12; 5 and 6; 5 and 7; 5-7; 5 and 8; 5 and 9; 5 and 10; 5, and 6 and 7; 5 and 12; 6 and 8; 6 and 9; 6 and 10; 6 and 12; 7 and 8; 7 and 9; 7 and 10; 7 and 12; 8 and 9; 8 and 10; 8 and 12; 9 and 10; 9 and 12; and 10 and 12. For B, any of the foregoing exemplary combinations may be in further combination with element 11 and/or element 12A.

To facilitate a better understanding of the disclosure herein, the following examples of various representative embodiments are given. In no way should the following examples be read to limit, or to define, the scope of the invention.

EXAMPLES

Example 1: Eagle Ford Shale Analyses

A core sample of Eagle Ford shale having a clay content of 21.5 wt. % was obtained for analyses. Thin disk sections used for the proppant embedment tests below were removed perpendicular to the bedding plane. Jordan Northern 40/70 white sand was used as the proppant particulates in the following proppant embedment tests.

The partially oxidized, amine-functionalized polysaccharide was prepared by reacting dextran with sodium periodate in water at room temperature (about 20° C.-22° C.) to produce partial oxidation of the monosaccharide units in the polymer chain. To the resulting dialdehyde was then added ethylenediamine in water at room temperature, and the intermediate imine was then reacted with sodium borohydride, again in water and at room temperature. A compound similar to that shown in Formula 1 above was formed in the reaction sequence.

The core sample was exposed to a compressive force of 8000 psi, either dry or when contacting a fracturing fluid, under conditions specified below. A control fracturing fluid containing 40/70 white sand in 0.2% aqueous KCl was prepared (referred to below as "wet control"). A test fracturing fluid containing 40/70 white sand and 1 gpt partially oxidized, amine-functionalized dextran in 0.2% aqueous KCl was also prepared.

Proppant embedment was measured on thin disk core samples under standard test conditions using a modified compressive strength test cell maintained at 8000 psi over the test time. The fluid contact time was 7 days, and the test temperature was 210° F. The target proppant layer width was equivalent to 3 sand grain layers, with an average initial proppant layer width of 735 microns being realized under the test conditions.

Tables 1 and 2 below summarize the proppant embedment testing results. Table 1 shows the proppant embedment directly observed on the thin disk sample, which represents a single-sided fracture face. Since actual fractures comprise two fracture faces, the direct measurements in Table 1 were processed to determine the extent of embedment occurring upon two opposing fracture faces. Table 2 shows the proppant embedment results as calculated for two opposing fracture faces.

TABLE 1

| Entry | Sample | Contact Time (days) | Aging Temp. (° F.) | Initial Proppant Layer Width (μm) | Change in Proppant Layer Width (μm) [% Decrease] | Avg. Pit Depth (μm) | Max. Pit Depth (μm) |
|---|---|---|---|---|---|---|---|
| 1 | Dry control | NA | NA | 698 | 40 [5.8%] | 16.9 | 24.9 |
| 2 | Wet control (0.2% KCl, tap water) | 7 | 210 | 760 | 135 [17.2%] | 71.1 | 98.8 |
| 3 | 1 gpt partially oxidized, amine-functionalized dextran (0.2% KCl, tap water) | 7 | 210 | 746 | 102 [13.7%] | 41.0 | 69.5 |

TABLE 2

| | Proppant Layer Width Upon Two Fracture Faces | | Total Proppant Embedment Depth Upon Two Fracture Faces | |
|---|---|---|---|---|
| Entry | Sample | Avg. Change in Proppant Layer Width (μm) | Max. Change in Proppant Layer Width (μm) | Avg. Total (μm) | Max. Total (μm) |
| 1 | Dry control | 57.3 | 65.2 | 33.8 | 49.8 |
| 2 | Wet control (0.2% KCl, tap water) | 205.8 | 233.5 | 142.3 | 197.6 |
| 3 | 1 gpt partially oxidized, amine-functionalized dextran (0.2% KCl, tap water) | 143.2 | 171.7 | 82.0 | 139.0 |

The values in Table 2 were calculated using Equations 1-4 below, with the values in the equations being substituted from Table 1.

$$\Delta_{avg, \text{ proppant layer width, 2 faces}} = \Delta_{avg, \text{ proppant layer width, 1 face}} + \text{Avg. Pit Depth} \quad (1)$$

$$\Delta_{max, \text{ proppant layer width, 2 faces}} = \Delta_{max, \text{ proppant layer width, 1 face}} + \text{Max. Pit Depth} \quad (2)$$

$$\text{Total Embedment Pit Depth}_{,avg.} = 2 \cdot (\text{Avg. Pit Depth}) \quad (3)$$

$$\text{Total Embedment Pit Depth}_{,max.} = 2 \cdot (\text{Max. Pit Depth}) \quad (4)$$

Figure 2:
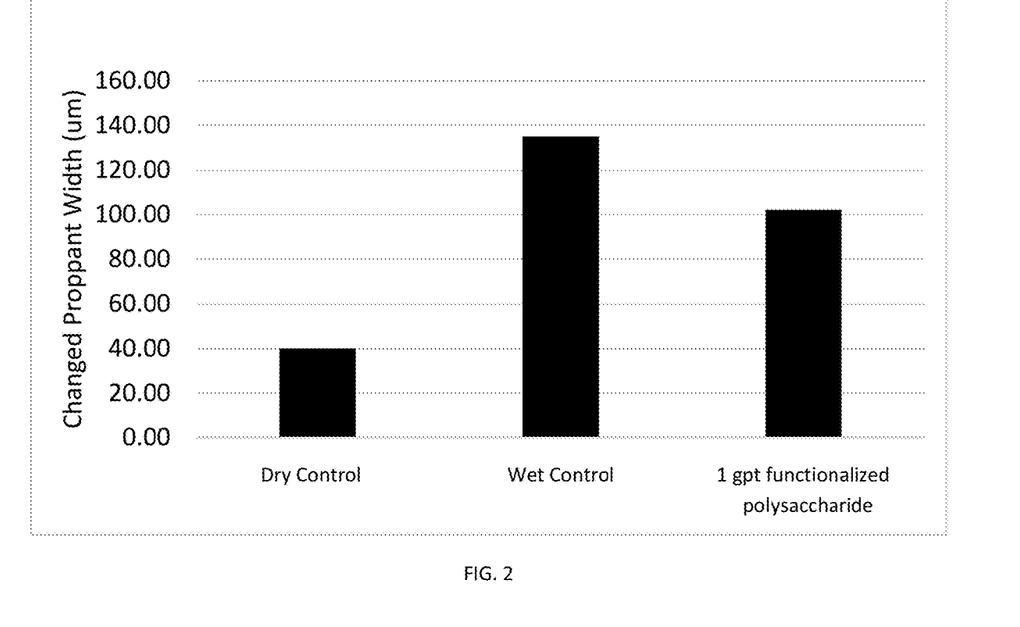
FIG. 2 shows a bar graph of the change in proppant layer depth when employing 1 gpt partially oxidized, amine-functionalized dextran in a fracturing fluid.

FIG. 2 shows a bar graph of the change in proppant layer depth when employing 1 gpt partially oxidized, amine-functionalized dextran. The change in proppant layer depth in the presence of the partially oxidized, amine-functionalized dextran was about 42% lower than that of the wet control. This value was determined from the average total proppant embedment depth values from Entries 2 and 3 in Table 2.

Figure 3:
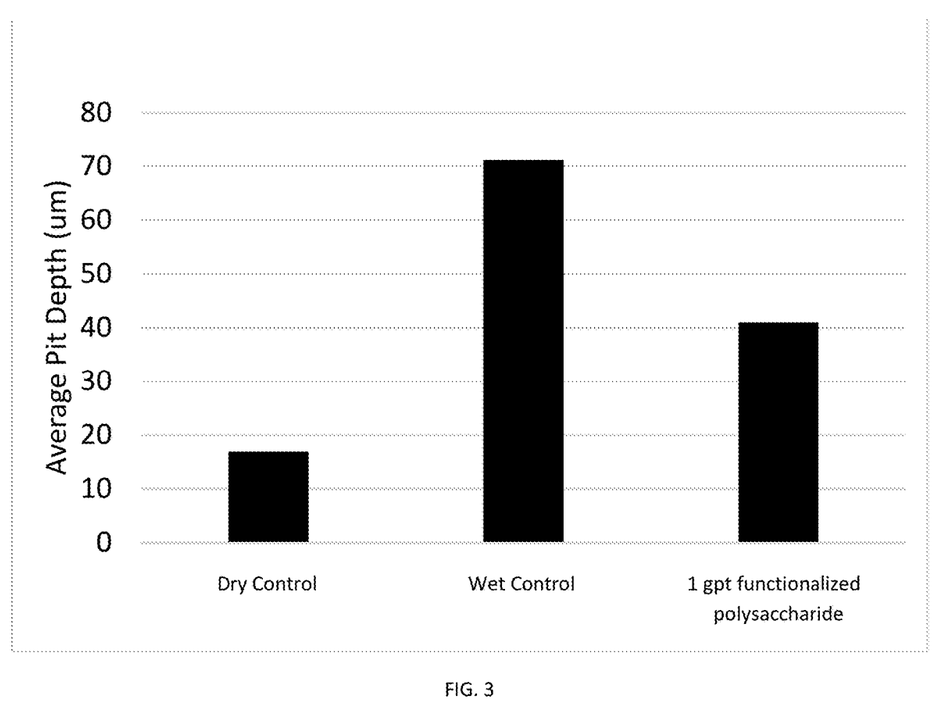
FIG. 3 shows a bar graph of the change in average pit depth when employing 1 gpt partially oxidized, amine-functionalized dextran in a fracturing fluid.

FIG. 3 shows a bar graph of the change in average pit depth when employing 1 gpt partially oxidized, amine-functionalized dextran. The change in average pit depth in the presence of the partially oxidized, amine-functionalized dextran was about 42% lower than that of the wet control. This value was determined from the average pit depth values from Entries 2 and 3 in Table 1.

Figure 4:
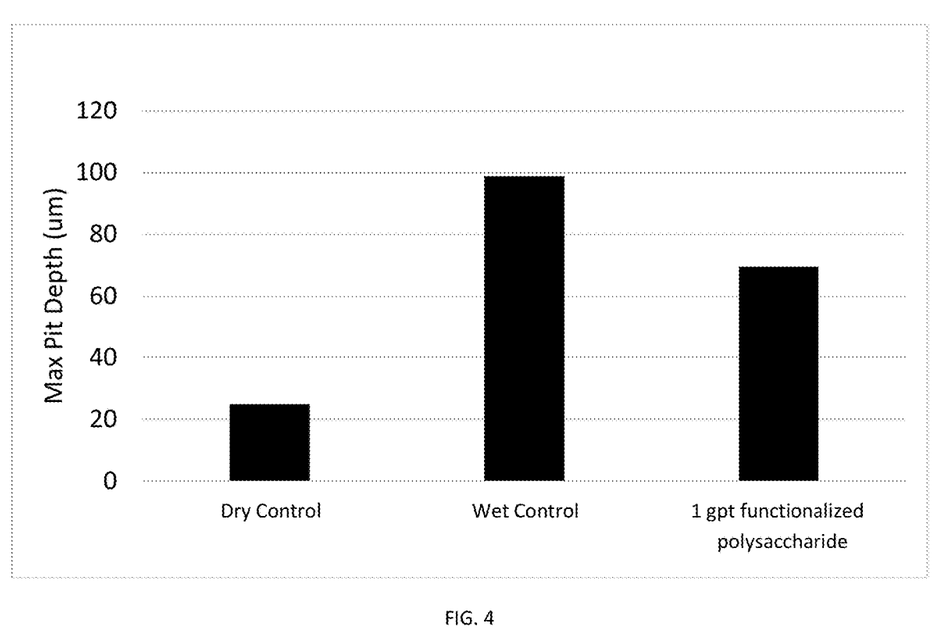
FIG. 4 shows a bar graph of the change in maximum pit depth when employing 1 gpt partially oxidized, amine-functionalized dextran in a fracturing fluid.

FIG. 4 shows a bar graph of the change in maximum pit depth when employing 1 gpt partially oxidized, amine-functionalized dextran. The change in maximum pit depth in the presence of the partially oxidized, amine-functionalized dextran was about 30% lower than that of the wet control. This value was determined from the maximum pit depth values from Entries 2 and 3 in Table 1.

As an aqueous potassium salt solution, the wet control represents a fluid that may be employed as a conventional clay control stabilizer. As shown in the data above, this clay control fluid is ineffective for limiting proppant embedment. When the partially oxidized, amine-functionalized polysaccharide is present, however, decreased proppant embedment and pitting may be realized.

Figure 5A:
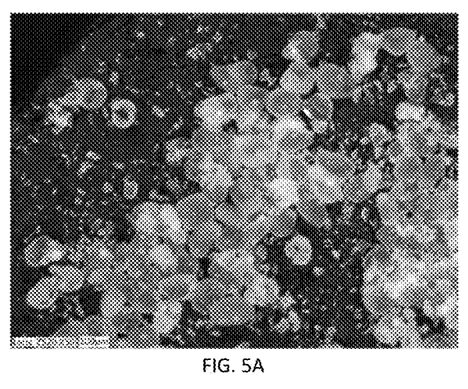
FIGS. 5A and 5B show images at 50× and 100×, respectively, of sand grains upon the fracture face of a core sample following compressive stress in the presence of 1 gpt partially oxidized, amine-functionalized dextran.
Figure 5B:
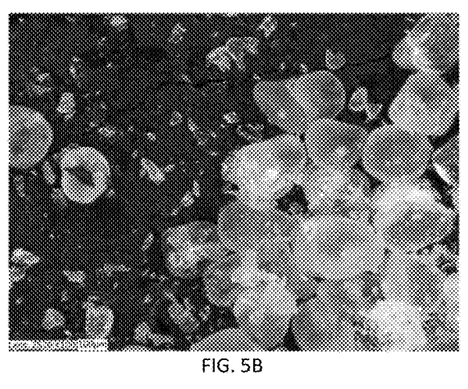
Figure 5C:
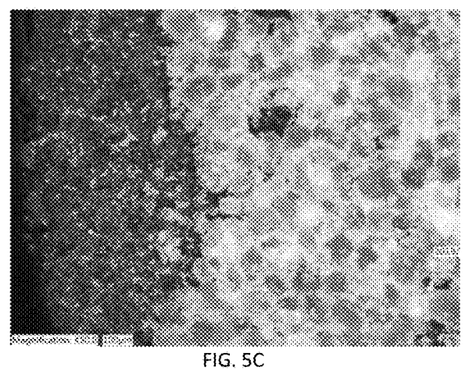
FIGS. 5C and 5D show respective magnification images for a wet control sample lacking the partially oxidized, amine-functionalized dextran and processed under similar conditions.
Figure 5D:
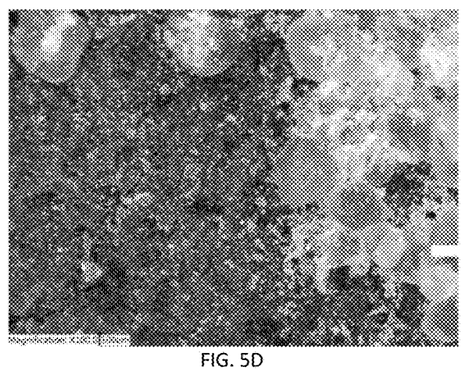

FIGS. 5A and 5B show images at 50× and 100×, respectively, of sand grains upon the fracture face following the release of the compressive force when employing 1 gpt partially oxidized, amine-functionalized dextran. FIGS. 5C and 5D show the respective magnification images of the wet control obtained under similar conditions. As shown, the sand grains in the samples treated with the partially oxidized, amine-functionalized dextran appeared to maintain their shape more completely, and the fines that were formed appeared larger than those formed from the wet control.

Example 2: Wolfcamp Shale Analyses

A core sample of Wolfcamp shale was obtained for analyses. 100 Mesh Northern white sand was used as the proppant particulates in the following proppant embedment tests. The sand was sieved before use per ISO 13503-2:2006 RP-19C "Measurements of proppants used in hydraulic fracturing and gravel pack operations." The partially oxidized, amine-functionalized polysaccharide in this example was the same as that utilized in Example 1 and was prepared similarly.

A first test sample containing 0.5 gpt of the partially oxidized, amine-functionalized polysaccharide and 0.75 gpt of high molecular weight partially hydrolyzed polyacrylamide (anionic polymer) in 2% aqueous KCl (Test Sample 1) was prepared and tested against the baseline conductivity. A second test sample having the same composition as Test Sample 1 and also containing 0.5 gpt of 7.5 vol. % $H_2O_2$ (Test Sample 2) was also prepared and tested against baseline conductivity. Permeability and conductivity values of the test samples were measured in comparison to the baseline conductivity of a 2% aqueous KCl solution (Control). The conductivity and permeability values of a 2% aqueous KCl solution containing 0.75 gpt high molecular weight partially hydrolyzed polyacrylamide (anionic polymer) and 0.5 gpt 7.5% $H_2O_2$ but lacking the partially oxidized, amine-functionalized polysaccharide (Comparative Sample) were also measured. The baseline conductivity measurements are discussed further below.

Conductivity testing was conducted at a maximum closure compressive stress force of 5000 psi using an Isco 260D apparatus. API Recommended Practice 19D "Procedures for measuring the long term conductivity of proppants" was used to obtain the conductivity values. Baseline conductivity of the Wolfcamp core sample was determined at 150° F. in the presence of 2% aqueous KCl solution (Control) with the proppant particulates loaded at 1.0 lb/ft² between opposing faces of the core sample. Baseline conductivity was evaluated by loading the sand between opposing faces of the core sample, while increasing the closure stress compressive force to 500 psi under vacuum and then to 1000 psi for a 12-24 hour equilibration period. 500 mL of the 2% aqueous KCl solution was then injected into the proppant pack in the core sample, and the closure stress compressive force was increased to 5000 psi over a 24 hour shut in period. After the shut in period, the cell was opened until fluid flow began at 0.5 mL/min flow rate. The maximum differential pressure to initiate flow was recorded. Additional readings were taken after 24 and 50 hours of fluid flow. Proppant pack width, differential pressure, temperature, and flow rate were recorded at each measurement time. Proppant pack permeability and conductivity were calculated using the Darcy equations (Equations 5 and 6).

$$kW_f = 26.78 \mu Q / (\Delta P) \quad (5)$$

$$k = 321.4 \mu Q / [\Delta P] W_f | \quad (6)$$

In Equations 5 and 6, k is proppant pack permeability in Darcy, $KW_f$ is the proppant pack conductivity in milliDarcy-feet, $\mu$ is the viscosity of the test fluid in cP at the testing temperature, Q is the flow rate in cm³/min, $\Delta P$ is the differential pressure in psi, and $W_f$ is the proppant pack width in inches.

The test and comparative samples were evaluated under similar conditions to those used for measuring the baseline permeability of the control. Regain permeability values of the test and comparative samples were calculated as a percentage by comparison against the baseline permeability of the control.

Table 3 below summarizes the conductivity and permeability values of the test and comparative samples in comparison to the control. Measurements in Table 3 are reported at 5000 psi after an initial equilibration period of 24 hours at 1000 psi. That is, at a time of 0 hours in Table 3, the core sample had already been exposed to the test or comparative sample for 24 hours at 1000 psi. The values at 0 hours were obtained immediately after increasing the pressure to 5000 psi.

TABLE 3

| Sample | Time at 5000 psi (hr) | Conductivity (mDarcy-ft) | Permeability (Darcy) | Fracture Width (in) | % Regain |
|---|---|---|---|---|---|
| Control | 0 | 219 | 21 | 0.124 | — |
| Control | 24 | 193 | 19 | 0.125 | — |
| Control | 48 | 175 | 17 | 0.123 | — |
| Comparative | 0 | 106 | 11 | 0.115 | 52 |
| Comparative | 24 | 148 | 16 | 0.111 | 84 |
| Comparative | 48 | 155 | 17 | 0.111 | 100 |
| Test Sample 1 | 0 | 210 | 21 | 0.120 | 100 |
| Test Sample 1 | 24 | 219 | 22 | 0.119 | 116 |
| Test Sample 1 | 48 | 231 | 23 | 0.118 | 135 |
| Test Sample 2 | 0 | 197 | 20 | 0.117 | 95 |
| Test Sample 2 | 24 | 229 | 24 | 0.115 | 126 |
| Test Sample 2 | 48 | 258 | 27 | 0.114 | 159 |

As shown in Table 3, the regain permeability exceeded 100% when the partially oxidized, amine-functionalized polysaccharide was present (Test Sample 1). When hydrogen peroxide was included in combination with the partially oxidized, amine-functionalized polysaccharide (Test Sample 2), the regain permeability was even higher. The high regain permeability values are characteristic of a low degree of proppant embedment. In contrast, Comparative Sample 1, which lacked the partially oxidized, amine-functionalized polysaccharide, exhibited lower regain permeability values. The low regain permeability occurred despite the presence of hydrogen peroxide in this sample.

Unless otherwise indicated, all numbers expressing quantities and the like in the present specification and associated claims are to be understood as being modified in all instances by the term "about." Accordingly, unless indicated to the contrary, the numerical parameters set forth in the following specification and attached claims are approximations that may vary depending upon the desired properties sought to be obtained by the embodiments of the present invention. At the very least, and not as an attempt to limit the application of the doctrine of equivalents to the scope of the claim, each numerical parameter should at least be construed in light of the number of reported significant digits and by applying ordinary rounding techniques.

One or more illustrative embodiments incorporating various features are presented herein. Not all features of a physical implementation are described or shown in this application for the sake of clarity. It is understood that in the development of a physical embodiment incorporating the embodiments of the present invention, numerous implementation-specific decisions must be made to achieve the developer's goals, such as compliance with system-related, business-related, government-related and other constraints, which vary by implementation and from time to time. While a developer's efforts might be time-consuming, such efforts would be, nevertheless, a routine undertaking for those of ordinary skill in the art and having benefit of this disclosure.

While various systems, tools and methods are described herein in terms of "comprising" various components or steps, the systems, tools and methods can also "consist essentially of" or "consist of" the various components and steps.

As used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

Therefore, the disclosed systems, tools and methods are well adapted to attain the ends and advantages mentioned as well as those that are inherent therein. The particular embodiments disclosed above are illustrative only, as the teachings of the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered, combined, or modified and all such variations are considered within the scope of the present disclosure. The systems, tools and methods illustratively disclosed herein may suitably be practiced in the absence of any element that is not specifically disclosed herein and/or any optional element disclosed herein. While systems, tools and methods are described in terms of "comprising," "containing," or "including" various components or steps, the systems, tools and methods can also "consist essentially of" or "consist of" the various components and steps. All numbers and ranges disclosed above may vary by some amount. Whenever a numerical range with a lower limit and an upper limit is disclosed, any number and any included range falling within the range is specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values. Also, the terms in the claims have their plain, ordinary meaning unless otherwise explicitly and clearly defined by the patentee. Moreover, the indefinite articles "a" or "an," as used in the claims, are defined herein to mean one or more than one of the elements that it introduces. If there is any conflict in the usages of a word or term in this specification and one or more patent or other documents that may be incorporated herein by reference, the definitions that are consistent with this specification should be adopted.

What is claimed is the following:

1. A method comprising:
    providing a fracturing fluid comprising an aqueous fluid, a plurality of proppant particulates, a mild oxidant, and a partially oxidized, amine-functionalized polysaccharide in which glycosidic bonds are retained from a parent polysaccharide and partial oxidation comprises oxidative opening of a monosaccharide unit of the parent polysaccharide;
    wherein an amine moiety is located at a site of oxidative opening;
    introducing the fracturing fluid into a subterranean formation comprising a shale at a hydraulic pressure sufficient to create or extend one or more fractures therein, such that at least a portion of the plurality of proppant particulates become localized in the one or more fractures; and releasing the hydraulic pressure;
  wherein embedment of the proppant particulates in a face of the one or more fractures is at most about 10% to about 40% of a grain size of the proppant particulates following release of the hydraulic pressure, a regain permeability of the subterranean formation exceeds 110% following release of the hydraulic pressure, or any combination thereof.

2. The method of claim 1, wherein the parent polysaccharide comprises a dextran, a levan, or a guar.

3. The method of claim 1, wherein the parent polysaccharide comprises a dextran or a dextrin.

4. The method of claim 3, wherein the dextrin comprises a maltodextrin.

5. The method of claim 1, wherein the parent polysaccharide comprises a plurality of monosaccharide units and about 5%-80% of the plurality of monosaccharide units are oxidatively opened and bear an amine moiety at the site of oxidative opening.

6. The method of claim 1, wherein the plurality of proppant particulates comprises a plurality of microproppant particulates.

7. The method of claim 6, wherein the plurality of proppant particulates comprises a plurality of sand particulates.

8. The method of claim 1, wherein the plurality of proppant particulates comprises a plurality of sand particulates.

9. The method of claim 1, wherein the amine comprises an alkylamine or an alkyl diamine.

10. The method of claim 1, wherein the mild oxidant is selected from the group consisting of hydrogen peroxide, sodium hypochlorite, potassium monoperoxysulfate, and any combination thereof.

11. The method of claim 1, wherein the aqueous fluid is an aqueous salt solution.

12. A method comprising:
  providing a pad fluid comprising an aqueous fluid and a partially oxidized, amine-functionalized polysaccharide in which glycosidic bonds are retained from a parent polysaccharide and partial oxidation comprises oxidative opening of a monosaccharide unit of the parent polysaccharide;
    wherein an amine moiety is located at a site of oxidative opening;
  introducing the pad fluid into a subterranean formation comprising a shale at a hydraulic pressure sufficient to create or extend one or more fractures therein;
  after introducing the pad fluid to the subterranean formation, introducing a fracturing fluid comprising the aqueous fluid and a plurality of proppant particulates into the subterranean formation, such that at least a portion of the plurality of proppant particulates become localized in the one or more fractures;
    wherein the pad fluid and/or the fracturing fluid further comprises a mild oxidant; and
  releasing the hydraulic pressure;
    wherein embedment of the proppant particulates in a face of the one or more fractures is at most about 10% to about 40% of a grain size of the proppant particulates following release of the hydraulic pressure, a regain permeability of the subterranean formation exceeds 110% following release of the hydraulic pressure, or any combination thereof.

13. The method of claim 12, wherein the fracturing fluid further comprises the partially oxidized, amine-functionalized polysaccharide.

14. The method of claim 12, wherein the parent polysaccharide comprises a dextran, a levan, or a guar.

15. The method of claim 12, wherein the parent polysaccharide comprises a dextran or a dextrin.

16. The method of claim 15, wherein the dextrin comprises a maltodextrin.

17. The method of claim 12, wherein the parent polysaccharide comprises a plurality of monosaccharide units and about 5%-80% of the plurality of monosaccharide units are oxidatively opened and bear an amine moiety at the site of oxidative opening.

18. The method of claim 12, wherein the plurality of proppant particulates comprises a plurality of microproppant particulates.

19. The method of claim 18, wherein the plurality of proppant particulates comprises a plurality of sand particulates.

20. The method of claim 12, wherein the plurality of proppant particulates comprises a plurality of sand particulates.

21. The method of claim 12, wherein the amine comprises an alkylamine or an alkyl diamine.

22. The method of claim 12, wherein the mild oxidant is selected from the group consisting of hydrogen peroxide, sodium hypochlorite, potassium monoperoxysulfate, and any combination thereof.

23. The method of claim 12, wherein the aqueous fluid is an aqueous salt solution.

* * * * *